United States Patent [19]

Onnenberg et al.

[11] Patent Number: 4,755,120
[45] Date of Patent: Jul. 5, 1988

[54] APPARATUS FOR THE PRODUCTION OF UPHOLSTERY WITH BACK-FOAMED COVERS

[75] Inventors: Volker Onnenberg, Wiehl; Günter Möllmann, Hagen, both of Fed. Rep. of Germany

[73] Assignees: Fritsche-Mollmann GmbH & Co., Lotte; Bayer Aktiengesellschaft, Leverkusen, both of Fed. Rep. of Germany

[21] Appl. No.: 100,503

[22] Filed: Sep. 24, 1987

[30] Foreign Application Priority Data

Oct. 4, 1986 [DE] Fed. Rep. of Germany ....... 3633923

[51] Int. Cl.⁴ ............................................. B29C 31/10
[52] U.S. Cl. ..................................... 425/125; 156/245; 156/285; 264/257; 264/549; 264/550; 425/4 R; 425/129 R; 425/399; 425/400; 425/405.1; 425/129.1
[58] Field of Search ............... 425/110, 116, 117, 125, 425/127, 128, 129 R, 4 R, 388, 395, 397–400, 403.1, 405.1, 406, 817 R; 156/245, 285; 264/257, 549, 550, DIG. 57

[56] References Cited

U.S. PATENT DOCUMENTS

| | | | |
|---|---|---|---|
| 3,172,927 | 3/1965 | Mojonnier | 264/550 |
| 3,260,781 | 7/1966 | Lux et al. | 264/550 X |
| 3,531,555 | 9/1970 | Tiffin et al. | 264/550 |
| 3,686,051 | 8/1972 | Samuel et al. | 156/245 X |
| 4,107,829 | 8/1978 | Urai et al. | 156/285 X |
| 4,378,265 | 3/1983 | Kiss | 156/245 X |
| 4,464,329 | 8/1984 | Whiteside et al. | 425/388 X |
| 4,692,199 | 9/1987 | Kozlowski et al. | 264/257 X |

FOREIGN PATENT DOCUMENTS

2746686  4/1979  Fed. Rep. of Germany .

Primary Examiner—Richard L. Chiesa
Attorney, Agent, or Firm—Gene Harsh; Joseph C. Gil

[57] ABSTRACT

The present invention is directed to an apparatus for the production of back-foamed covers from cover materials and foam comprising (i) a mold comprising an upper mold half and a lower mold half, the lower mold half having a cavity therein, the inside surface of which is capable of being covered by the cover material, (ii) a mixhead associated with the mold, the mixhead capable of introducing foam materials and/or reactants into the mold cavity, (iii) a pusher bar arranged on a mount for pushing the cover material into the mold cavity and being arranged above the lower mold half, the pusher bar being constructed such that when the bar is pushing the cover material into the mold cavity, a gap is formed between the edge of the mold cavity and the edge of the pusher bar, the gap being less than the thickness of the cover material, (iv) the lower mold half being movable towards and/or away from the pusher bar, and (v) the surface of the pusher bar facing the mold cavity edge being a frictional surface.

7 Claims, 2 Drawing Sheets

APPARATUS FOR THE PRODUCTION OF UPHOLSTERY WITH BACK-FOAMED COVERS

BACKGROUND OF THE INVENTION

The present invention relates to an apparatus for the production of upholstery with back-foamed covers, and in particular, for motor car seats.

Various attempts have been made to find a method of placing the piece of cover material into the mold cavity in such a manner that the cover material will be free from folds. If folds are unavoidable, they should be placed reproducibly in prearranged positions and the cover material should sit firmly against the wall of the mold cavity at every point.

It is generally known to use so-called vacuum molds for this purpose. In these molds, the cover material is sucked against the wall of the mold by a vacuum applied through perforations in the wall.

A stretching frame which surrounds the mold cavity is generally also used. The cover material is placed over the lower mold half and is pressed with a controlled pressure against the surface of the lower mold half. Finally, a so-called top ram may be used to push the piece of cover material into the mold cavity. In most cases, all three measures are used together (German Offenlegungsschrift No. 2,746,686). Any one of these measures may, of course, be used alone but the result obtained is less perfect. Even the combination of all three measures has its limits if the piece of upholstery to be produced has a complicated shape (for example with undercut portions) and the mold cavity then, of course, has an equally complicated geometry. At these critical points (e.g. undercut portions) it is extremely difficult to place the cover material firmly against the wall of the mold cavity without excessive direct manual intervention. Even the subsequent process of back-foaming cannot ensure that the cavity of the mold will be completely filled. Imperfectly shaped articles of upholstery are not only unsightly but also unusable and simply constitute waste.

The problem arises of finding a method which ensures that in the manufacture of articles of upholstery of the kind mentioned above which have a complicated shape (which is reflected by a similarly complicated shape of the mold cavity), the cover material will be more completely placed against the wall of the mold cavity at the particularly critical points of the cavity, especially at undercut areas.

DESCRIPTION OF THE INVENTION

Figure 1:
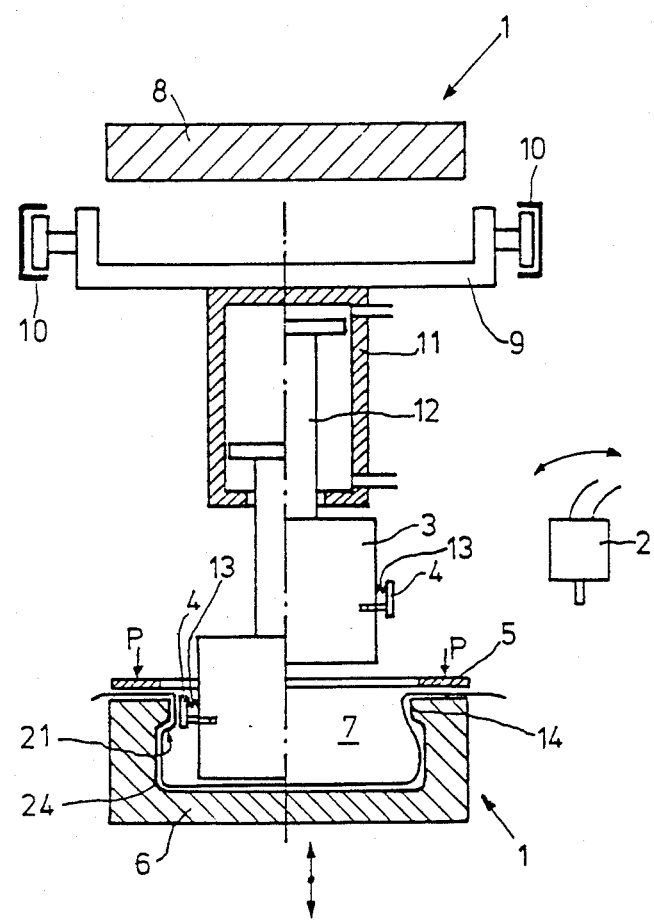
FIG. 1 is a sectional view through the apparatus.

The above problem is solved by arranging a pusher bar on a mount over the lower mold half, the mount and respectively the bar being movable towards and/or away from the lower mold half. The shape of the pusher bar is adapted to the contour of the edge of the mold cavity. When the bar is in the position for pushing the cover material into the cavity, a gap which is less than the thickness of the cover material is left between the edge of the mold cavity and the pusher bar. The surface of the bar facing this edge is a frictional surface. More particularly, the present invention is directed to an apparatus for the production of back-foamed covers from cover materials and foam, comprising (i) a mold comprising an upper mold half and a lower mold half, said lower mold half having a cavity therein, the inside surface of which is capable of being covered by said cover material, (ii) a mixhead associated with said mold, said mixhead capable of introducing foam materials and/or reactants into said mold cavity, (iii) a pusher bar arranged on a mount for pushing said cover material into said mold cavity and being arranged above said lower mold half, said pusher bar being constructed such that when said bar is pushing said cover material into said mold cavity, a gap is formed between the edge of the mold cavity and the edge of the pusher bar, said gap being less than the thickness of said cover material, (iv) said lower mold half being movable towards and/or away from said pusher bar, and (v) the surface of said pusher bar facing said mold cavity edge being a frictional surface. It is, of course, particularly advantageous to combine the use of the pusher bar with a vacuum mold, a stretching frame and/or an upper ram. There may, however, be cases in which the pusher bar alone is sufficient to place the cover material firmly against the wall of the mold cavity with only a little manual aid. When relative displacement takes place between the pusher bar and the edge of the mold cavity, the frictional surface carries the cover material with it so that sufficient cover material is available, especially at the undercut areas, to enable it to be placed in contact with the mold at every point. The nature of the frictional surface and its height should, of course, be adapted to the particular case. The frictional surface must be of such a nature that it grips the cover material sufficiently firmly to be able to push it along. To ensure that this will take place efficiently, the use of the frictional surface should be combined with a gap between the edge and the frictional surface of the pusher bar. The height of the frictional surface ensures that the required quantity of covering material will be pushed into the mold. These factors can easily be optimized from case to case by preliminary tests.

According to a first embodiment, the frictional surface is obtained by roughening the surface, for example, by the formation of a grating or grooves or serrations. Such roughening must be suitably adapted to the nature of the back of the cover material so as not to damage the material. Alternatively, the frictional surface may consist of an elastomer lining. Here again, the hardness of the surface must be suitably chosen according to the nature of the back of the covering material. The elastomer lining may, of course, in addition have surface contours.

The pusher bar is preferably spring mounted. This enables the gap between the pusher bar and the edge of the mold cavity to be completely filled by the portion of cover material between them. The spring mounted pusher bar can be pressed against the cover material as required and a particularly firm thrust can be exerted on the cover material due to the increased friction.

Since this type of pusher bar would in most apparatus obstruct the closing of the mold, the bar is preferably mounted in such a manner that it can be removed from the vertical area of projection of the mold or mold cavity. This may be achieved by mounting either the pusher bar or the lower mold half displaceably, the latter being more preferred.

The pusher bar is preferably arranged on a mount designed as a supporting frame. This has the advantage that it can be mounted to move on rails. It should, of course, be fixed when in its operative position.

If an upper ram is used as the mount, the pusher bar may preferably be mounted on the side of the ram. It can then be removed from the area of projection together with the upper ram. The upper ram, and hence indirectly the pusher bar, may be attached to a supporting frame.

An exemplary embodiment of the new apparatus is shown schematically in the drawing and described below.

Figure 2:
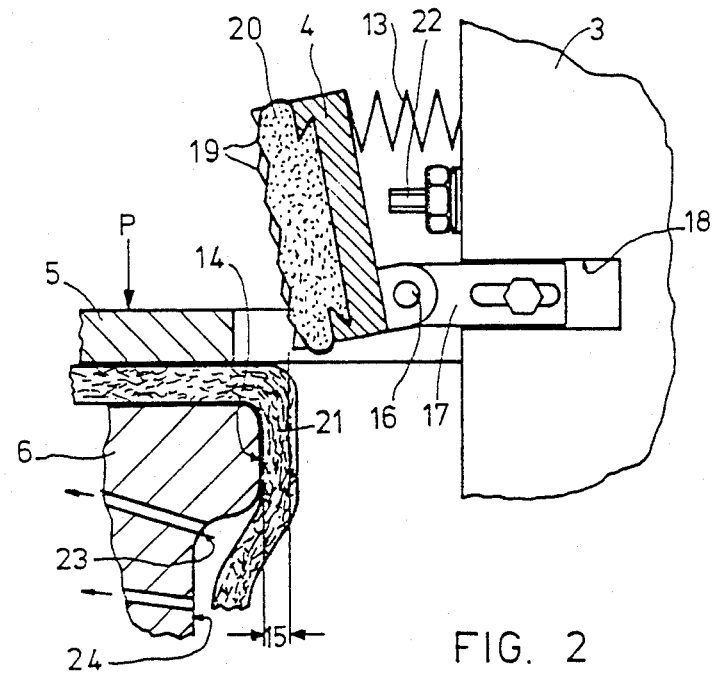
FIG. 2 is an enlarged and detailed view of the arrangement of the pusher bar of the apparatus of FIG. 1.

The apparatus shown in FIGS. 1 and 2 comprises a vacuum mold 1, a mixhead 2, a mount 3 designed as a displaceable upper ram 3 with a pusher bar 4 and a stretching frame 5.

The vacuum mold 1 comprises a lower mold half 6 which contains the mold cavity 7 and can be moved towards the fixed, upper mold half 8 for closing and opening of the vacuum mold 1. The mixhead 2, which is shown purely diagrammatically, can be deflected to be placed over the mold cavity 7 for the introduction of a foamable, and preferably a polyurethane, reaction mixture. The upper ram 3 is fixed to a supporting frame 9 which is displaceable in rails 10 so that it can be moved out of the vertical range of projection of the mold 1 with mold cavity 7. The upper ram 3 has a piston 12 which can be operated hydraulically from both ends in a cylinder 11. FIG. 1 shows the top ram 3 in its upper position on the righthand side and in its lowered position on the lefthand side. Pusher bars 4 are arranged at the sides of the upper ram 3. They are mounted on the upper ram 3 by springs 13 (see FIG. 2) and are so adjusted in relation to the inner edge 14 of the mold cavity 7 that a small gap 15 is left between them. For this purpose, the pusher bar 4 is connected by a hinge 16 to fishplates 17 which can be mounted and fixed in recesses 18 in the upper ram 3 (only one fishplate and one recess are shown). The pusher bar 4 has a frictional surface 20 consisting of an elastomer lining of polyurethane with contours 19 in the form of elevations. As the bar 4 moves downwards, it presses against the piece of cover material 21 in the gap 15 and pushes the cover material along. The compression of the spring 13 is limited by an adjustable stop pin 22 to ensure that a maximum width of gap 15 is maintained. Since the portion of cover material 21 which has been pushed forward by the frictional surface is momentarily not under tension, the vacuum is again sufficient to draw it against the wall 24 of the mold cavity 7 even in the undercut parts 23.

Figure 3:
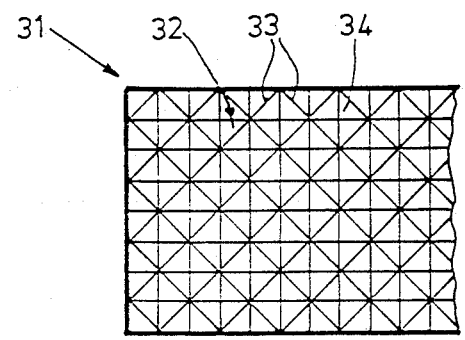
FIG. 3 is a top plan view showing one embodiment of the frictional surface of the pusher bar.

FIG. 3 shows the pusher bar 31 with a frictional surface 32 formed by a roughening consisting of intersecting grooves 33 forming four-sided pyramids 34.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for the production of back-foamed covers from cover materials and foam comprising
   (i) a mold comprising an upper mold half and a lower mold half, said lower mold half having a cavity therein, the inside surface of which is capable of being covered by said cover material,
   (ii) a mixhead associated with said mold, said mixhead capable of introducing foam materials and/or reactants into said mold cavity,
   (iii) a pusher bar arranged on a mount for pushing said cover material into said mold cavity and being arranged above said lower mold half, said pusher bar being constructed such that when said bar is pushing said cover material into said mold cavity, a gap is formed between the edge of the mold cavity and the edge of the pusher bar, said gap being less than the thickness of said cover material,
   (iv) said lower mold half being movable towards and/or away from said pusher bar, and
   (v) the surface of said pusher bar facing said mold cavity edge being a frictional surface.

2. The apparatus of claim 1, characterized in that the frictional surface consists of a roughening.

3. The apparatus of claim 1, characterized in that the frictional surface consists of an elastomer 4. The apparatus of claim 1, characterized in that the pusher bar is spring mounted.

5. The apparatus of claim 1, characterized in that the pusher bar is arranged to be removable from the range of vertical projection of the mold cavity.

6. The apparatus of claim 1, characterized in that the pusher bar is arranged on a mount designed as a supporting frame.

7. The apparatus of claim 1, characterized in that the mount consists of an upper ram.

* * * * *